US010038401B2

(12) United States Patent
Khan et al.

(10) Patent No.: US 10,038,401 B2
(45) Date of Patent: Jul. 31, 2018

(54) SYSTEMS AND METHODS FOR FAULT DETECTION

(71) Applicant: THE UNIVERSITY OF UTAH RESEARCH FOUNDATION, Salt Lake City, UT (US)

(72) Inventors: Faisal Habib Khan, Salt Lake City, UT (US); Mohammed K. Alam, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 571 days.

(21) Appl. No.: 14/626,270

(22) Filed: Feb. 19, 2015

(65) Prior Publication Data

US 2015/0236643 A1 Aug. 20, 2015

Related U.S. Application Data

(60) Provisional application No. 61/941,944, filed on Feb. 19, 2014.

(51) Int. Cl.
*H02S 50/15* (2014.01)
(52) U.S. Cl.
CPC .................... *H02S 50/15* (2014.12)
(58) Field of Classification Search
CPC ........ H02S 50/15; G01R 31/11; G01R 31/088
USPC ........................................................ 702/58
See application file for complete search history.

(56) References Cited

U.S. PATENT DOCUMENTS

| 6,868,357 | B2 | 3/2005 | Furse |
| 7,165,200 | B2 * | 1/2007 | Jani ...................... G01R 31/088 |
| | | | 714/724 |
| 7,250,772 | B2 * | 7/2007 | Furse .................... G01R 31/11 |
| | | | 324/533 |
| 7,282,922 | B2 | 10/2007 | Lo et al. |
| 7,548,071 | B2 | 6/2009 | Harrison et al. |
| 7,622,931 | B2 | 11/2009 | Wu et al. |
| 7,634,012 | B2 | 12/2009 | Farhang-Boroujeny et al. |
| 8,324,906 | B2 * | 12/2012 | Ahamed ................ G01R 31/11 |
| | | | 324/533 |
| 8,359,177 | B2 | 1/2013 | Lelong et al. |
| 2011/0181295 | A1 * | 7/2011 | Haugen ................ G01R 31/024 |
| | | | 324/543 |
| 2011/0227582 | A1 * | 9/2011 | Ahamed ................ G01R 31/11 |
| | | | 324/533 |

(Continued)

OTHER PUBLICATIONS

Alam et al, "PV Ground-Fault Detection Using Spread Spectrum Time Domain Reflectometry (SSTDR)," Energy Conversion Congress and Exposition (ECCE) in Denver Colorado, Sep. 15-19, 2013, pp. 1015-1102, Published by IEEE.

(Continued)

*Primary Examiner* — Tri Hoang
(74) *Attorney, Agent, or Firm* — Stoel Rives LLP (57) ABSTRACT

A fault detection module acquires Spread Spectrum Time Domain Reflectometry (SSTDR) data pertaining to an electrical system, such as a photovoltaic string. A fault may be detected by use of difference data, calculated by comparing the SSTDR autocorrelation data to baseline SSTDR autocorrelation data previously acquired from the electrical system. The cumulative difference in the SSTDR autocorrelation data may indicate the presence of a fault and/or the location of the fault within the electrical system.

20 Claims, 9 Drawing Sheets

(56) References Cited

U.S. PATENT DOCUMENTS

2011/0251807 A1  10/2011  Rada et al.

OTHER PUBLICATIONS

Alam, et al "A Robust Algorithm for Detecting PV Array Ground Faults Using Spread Spectrum Time Domain Reflectometry (SSTDR)," submitted to the Journal of Emerging and Selected Topics in Power Electronics on Jun. 30, 2015.

"Photovoltaic system," article from Wikipedia, accessed online at http:www.en.wikipedia.org/wiki/Photovoltaic_system on Feb. 10, 2014.

* cited by examiner

SYSTEMS AND METHODS FOR FAULT DETECTION

TECHNICAL FIELD

This disclosure relates to detection of fault conditions and, in particular, to detecting and locating ground faults in a photovoltaic (PV) electrical system using Spread Spectrum Time Domain Reflectometry (SSTDR).

BACKGROUND

SSTDR can be used to detect faults in many types of electrical networks. SSTDR typically involves a) transmitting a signal into the electrical network under test (e.g., transmitting a pseudo random binary signal modulated sine wave through a transmission line), b) detecting the reflected signal, and c) identifying impedance mismatches in the electrical network by, inter alia, autocorrelation between the transmitted signal(s) and the reflected signal(s). This approach, however, breaks down when applied to PV electrical systems that comprise large numbers of interconnections and impedance mismatches. As used herein, a PV electrical system or PV electrical network refers to an electrical system comprising photovoltaic elements, such as solar panels, solar cells, PV strings, and/or the like.

The procedure for finding faults in a PV system may require numerous manual isolation and measurement steps. At each step of the procedure, the current flow within a respective subsection of the PV system is checked by a) isolating the subsection, and b) evaluating the subsection by, inter alia, acquiring one or more of open-circuit voltage ($V_{OC}$) measurement(s), positive-to-ground current measurement(s), and negative-to-ground current measurement(s). The measurements may require the subsection of the PV system to be online (e.g., be receiving electro-optical (EO) radiation, such as sunlight), and may further involve the use of irradiance and/or temperature sensors to evaluate the functionality of the PV subsection. Moreover, after fault testing, the PV system has to be restored, which may involve reconnecting the subsections of the PV system, and validating the corresponding connections. Therefore, improved mechanisms for detecting fault conditions in electrical networks, such as PV systems, are needed.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Disclosed herein are systems, methods, and apparatus for detecting ground fault conditions in PV electrical systems, using, inter alia, SSTDR. As disclosed above, SSTDR typically comprises a) transmitting spread spectrum signals into a PV electrical system, b) observing the reflected spread spectrum signals, and c) generating an output comprising an autocorrelation between the transmitted spread spectrum signals and the reflected spread spectrum signals. As noted above, this approach may not be effective in the presence of numerous interconnections and impedance mismatches, which are common in PV electrical systems (e.g., electrical systems that include series-connected solar cells, PV strings, and/or the like). As disclosed in further detail herein, the presence and/or location of a fault in a PV electrical system may be determined by comparing SSTDR autocorrelation data obtained at different times. SSTDR autocorrelation data may be periodically and/or continuously acquired and compared against "baseline" autocorrelation data for the system. As used herein, "baseline" autocorrelation data refers to SSTDR autocorrelation data acquired during normal, no-fault operating conditions of the PV electrical system. Baseline autocorrelation data may comprise and/or incorporate a plurality of different sets of SSTDR autocorrelation data acquired at different times and/or under different operating conditions for the PV electrical system (e.g., different EO radiation levels, shade conditions, etc.). In some embodiments, the baseline autocorrelation data comprises an average and/or mean of a plurality of different SSTDR autocorrelation data sets.

Differences between the baseline and current SSTDR autocorrelation data may indicate the presence of a fault in the PV electrical system. In some embodiments, the location of a fault may be derived from a cumulative difference between the SSTDR autocorrelation data (e.g., cumulative area under an SSTDR autocorrelation difference curve). Accordingly, one embodiment of a method for detecting a fault in a PV electrical system comprises: a) acquiring first SSTDR autocorrelation data pertaining to the PV electrical system at a first time, b) acquiring second SSTDR autocorrelation data pertaining to the PV electrical system at a second, different time, and c) comparing the first and second SSTDR autocorrelation data. Comparing the SSTDR autocorrelation data may comprise, inter alia, generating SSTDR autocorrelation difference data, such as the cumulative difference between the SSTDR autocorrelation data sets.

Figure 1A:
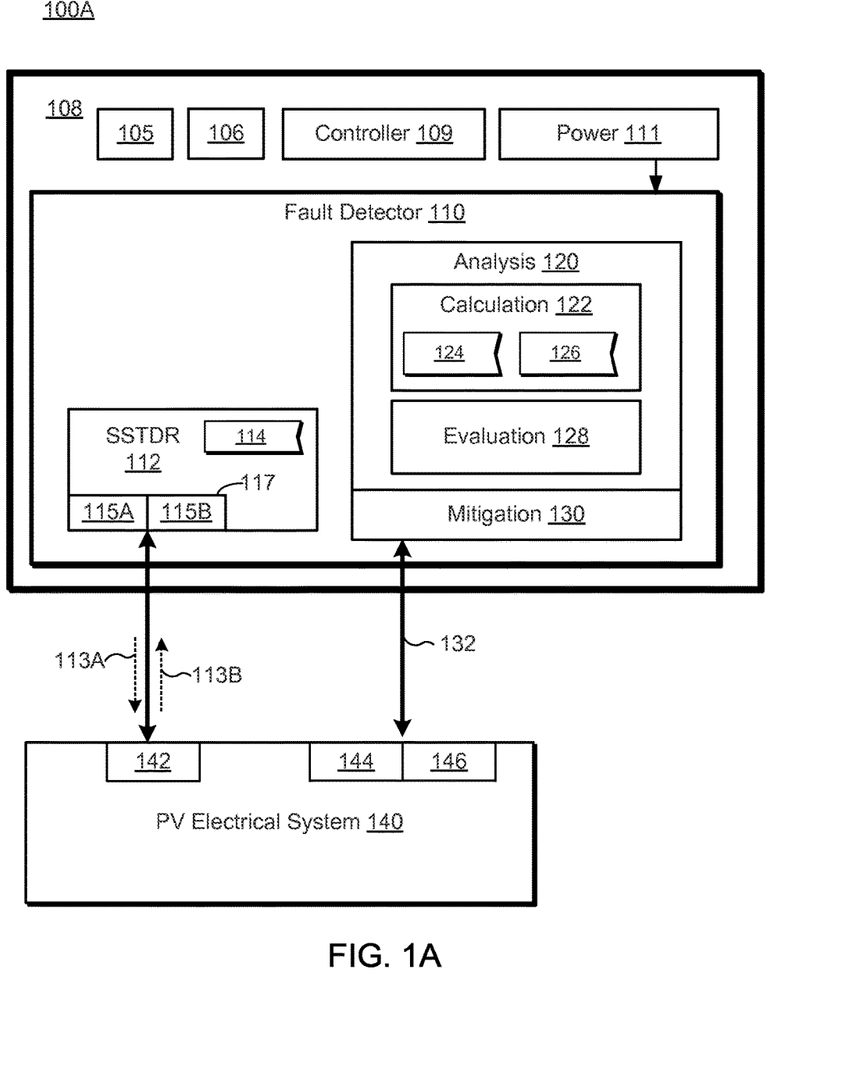
FIG. 1A is a schematic block diagram of one embodiment of a system for detecting fault conditions in a PV electrical system.

FIG. 1A is a schematic block diagram of one embodiment of a system 100A for detecting a fault in a PV electrical system 140. The system 100A may comprise a fault detection device 108 comprising a fault detector 110. As disclosed in further detail herein, the fault detector 110 may be configured to detect fault conditions in an electrical system, such as the PV electrical system 140. In some embodiments, the fault detector 110 is be implemented by use of a computing device, such as a personal computing device, a portable computing device, an embedded computing device, and/or the like. Alternatively, and as depicted in FIG. 1A, the fault detector 110 may be implemented as a stand-alone fault detection device 108 comprising a human-machine interface (HMI) 105, a controller 109, and a power source 111. The HMI 105 may comprise input/output components of the fault detection device 108, which may include, but are not limited to: a display device (e.g., monitor, holographic display, and so on), audio device (e.g., speaker, microphone, and so on), user input device (e.g., keyboard, mouse, touch input device, gesture input device, and so on), and/or the like. In some embodiments, the fault detection device 108 further comprises a communication interface 106 to communicatively couple the fault detector 110 to a network, such as a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

The controller 109 may be configured to manage the fault detector 110 in response to inputs received through the HMI 105 (and/or communication interface 106) and/or display outputs generated by the fault detector 110 by use of the HMI 105. The power module 111 may be configured to provide power to the HMI 105, controller 109, fault detector 110 and/or other components of the fault detection device 108. In some embodiments, the power module 111 is coupled to an external power source (not shown). Alternatively, or in addition, the power module 111 may comprise an internal power source, such as a battery, capacitor, and/or the like.

The fault detector 110 and/or the components thereof, such as the SSTDR module 112, may be embodied as hardware components, which may include, but are not limited to: a circuit, an integrated circuit, an application-specific integrated circuit (ASIC), a processor, a hardware controller, a programmable controller, programmable logic, a Programmable Logic Array (PLA), a Field Programmable Gate Array (FPGA), and/or the like. Alternatively, or in addition, the fault detector 110 may be implemented and/or embodied as a driver, a library, an interface, an Application Programming Interface (API), FPGA configuration data, firmware (e.g., stored on an Electrically Erasable Programmable Read-Only Memory (EEPROM)), and/or the like. Accordingly, portions of the fault detector 110 may comprise computer-readable instructions stored on a non-transitory computer-readable storage medium.

The fault detector 110 may be configured to detect fault conditions in the PV electrical system 140 by: a) acquiring SSTDR autocorrelation data from the PV electrical system 140 (by use of the SSTDR module 112), and b) analyzing the acquired SSTDR autocorrelation data to determine whether a fault condition exists in the PV electrical system 140 and, if so, determine a location of the fault (by use of the analysis module 120).

The SSTDR module 112 may be electrically coupled to the PV electrical system 140 through, inter alia, a transceiver 117. The transceiver 117 may comprise an input generator circuit 115A and an signal detection circuit 115B. The input generator circuit 115A is configured to transmit input signals 113A into the PV electrical system 140 (at a connection point 142). The signal detection circuit 115B is configured to detect output signals 113B corresponding to the input signals 113A (e.g., signals reflected within the PV electrical system 140). The SSTDR module 112 may be further configured to generate SSTDR autocorrelation data 114 by calculating an autocorrelation between the input signals 113A and the reflected output signals 113B. The SSTDR module 112 may be further configured to measure and/or convert the input signals 113A and/or output signals 113B into discrete quantities by use of, inter alia, an analog-to-digital converter, and/or the like.

The analysis module 120 may comprise hardware elements, such as a circuit, processor, ASIC, FPGA, PLA, and/or the like. Alternatively, or in addition, portions of the analysis module 120 may be implemented by use of general-purpose computing resources and/or may be embodied as computer-readable instructions stored on a non-transitory computer-readable storage medium. The analysis module 120 may comprise a calculation module 122 configured to calculate difference data 126 based on, inter alia, the SSTDR autocorrelation data 114 acquired by the SSTDR module 112. The difference data 126 may comprise a difference and/or absolute value difference between the SSTDR autocorrelation data 114 acquired by the SSTDR module 112 and previously acquired, baseline SSTDR autocorrelation data 124 pertaining to the PV electrical system 140. The baseline SSTDR autocorrelation data 124 may comprise SSTDR autocorrelation data acquired during normal, non-fault operating conditions of the PV electrical system 140 (e.g., when no fault condition(s) exist in the PV electrical system 140). The fault detector 110 may be configured to acquire the baseline SSTDR autocorrelation data 124 during an initial configuration and/or deployment of the PV electrical system 140 and/or during controlled operating conditions of the PV electrical system 140. The baseline SSTDR autocorrelation data 124 may comprise and/or incorporate a plurality of different SSTDR autocorrelation data sets acquired at different times and/or under different, non-fault operating conditions of the PV electrical system 140.

The baseline SSTDR autocorrelation data 124 may be acquired by use of the transceiver 117, which may comprise transmitting signals 113A into the PV electrical system 140 and detecting return signals 113B, as disclosed herein. The fault detector 110 may be further configured to store the baseline SSTDR autocorrelation data 124 on a persistent, non-volatile storage medium, a network storage location, and/or the like.

As disclosed above, the difference data 126 may comprise an autocorrelation difference between the currently acquired SSTDR autocorrelation data 114 and the previously acquired baseline SSTDR autocorrelation data 124. In some embodiments, the difference data 126 comprises a sequence of difference values calculated by bit and/or sample-wise subtraction operations between the SSTDR autocorrelation data 114 and the baseline SSTDR autocorrelation data 124 (e.g., difference data 126=SSTDR autocorrelation data 114−baseline SSTDR autocorrelation data 124). Alternatively, or in addition, the difference data 126 may comprise an absolute value difference between the SSTDR autocorrelation data 114 and the baseline autocorrelation data 124 (e.g., difference data 126=|SSTDR autocorrelation data 114−baseline SSTDR autocorrelation data 124|).

The analysis module 120 may further comprise an evaluation module 128 configured to determine a) whether a fault exists in the PV electrical system 140, and/or b) a location of the fault, by use of the difference data 126. In some embodiments, the evaluation module 128 is configured to distinguish faults from thermal and other inherent noise by a) calculating a cumulative energy of the difference data 126 (e.g., integrating the difference data 126), and b) comparing the cumulative energy to a threshold. The evaluation module 128 may trigger detection of a fault condition in response to, inter alia, the cumulative energy value corresponding to the difference data 126 exceeding a threshold.

The evaluation module 128 may be further configured to determine the location of the fault (if any) within the PV electrical system 140. The inventors have observed a correlation between the proximity of a fault to the connection point 142 between the SSTDR module 112 and the PV electrical system 140 and the magnitude of the signal(s) reflected from the fault. Therefore, faults that are closer to the connection point 142 result in difference data 126 that is larger in magnitude than faults further from the connection point 142. The correlation may be non-linear.

The fault detector 110 may notify a user of fault conditions by use of, inter alia, the controller 109 and/or HMI 105. In response to detecting a fault condition, the fault detector 110 may issue an alert, interrupt, and/or other notification to the controller 109 over a communication channel of the fault detection device 108, such as a system bus, local bus, communication interface 106, and/or the like. In response, the controller 109 may present information pertaining to the detected fault condition to a user through the HMI 105, which may comprise one or more of: displaying information pertaining to the fault condition on a display device, issuing an audio alert, activating an external alert system (e.g., triggering an alarm or other notification system), transmitting one or more messages pertaining to the detected fault over a communication network (by use of the communication interface 106) and/or the like. The controller 109 may be further configured to display information pertaining to the detected fault, such as the location of the fault and/or the like, as disclosed in further detail herein.

In some embodiments, the fault detector 110 further includes a fault mitigation module 130, which may be configured to implement one or more actions in response to detection of a fault condition within the PV electrical system 140. The mitigation module 130 may be configured to implement any suitable operation including, but not limited to: displaying information pertaining to the fault, issuing a notification and/or alert pertaining to the fault, activating an external alert system, transmitting one or more messages pertaining to the fault condition, and/or the like, as disclosed herein. In some embodiments, the mitigation module 130 is communicatively coupled to the PV electrical system 140. The mitigation module 130 may be communicatively coupled to the PV electrical system through a communication channel 132, which may include, but is not limited to: a Distributed Control System (DCS) communication channel, a Supervisory Control and Data Acquisition (SCADA) communication channel, and/or the like.

In some embodiments, the mitigation module 130 is configured to modify and/or reconfigure the PV electrical system 140 in response to detecting a fault condition. In one embodiment, the mitigation module 130 is configured to selectively disconnect portions of the PV electrical system 140 in order to, inter alia, isolate the detected fault (based on the determined location of the fault, as disclosed herein). The mitigation module 130 may be configured to isolate and/or re-route portion(s) of the PV electrical system 140 experiencing fault conditions by use of hardware components 146 of the PV electrical system 140, which may include, but are not limited to: a circuit breaker, a Disconnecting Circuit Breaker (DCG), Ground Fault Circuit Interrupter (GFCI), a switch, switchgear, a transfer switch, and/or the like. Alternatively, or in addition, the mitigation module 130 is communicatively coupled to a controller 144 of the PV electrical system 140. The mitigation module 130 may notify the controller 144 of detected fault conditions (including a determined location of the fault conditions) by use of the communication channel 132. In response, the controller 144 may implement one or more mitigation operations within the PV electrical system 140.

Figure 1B:
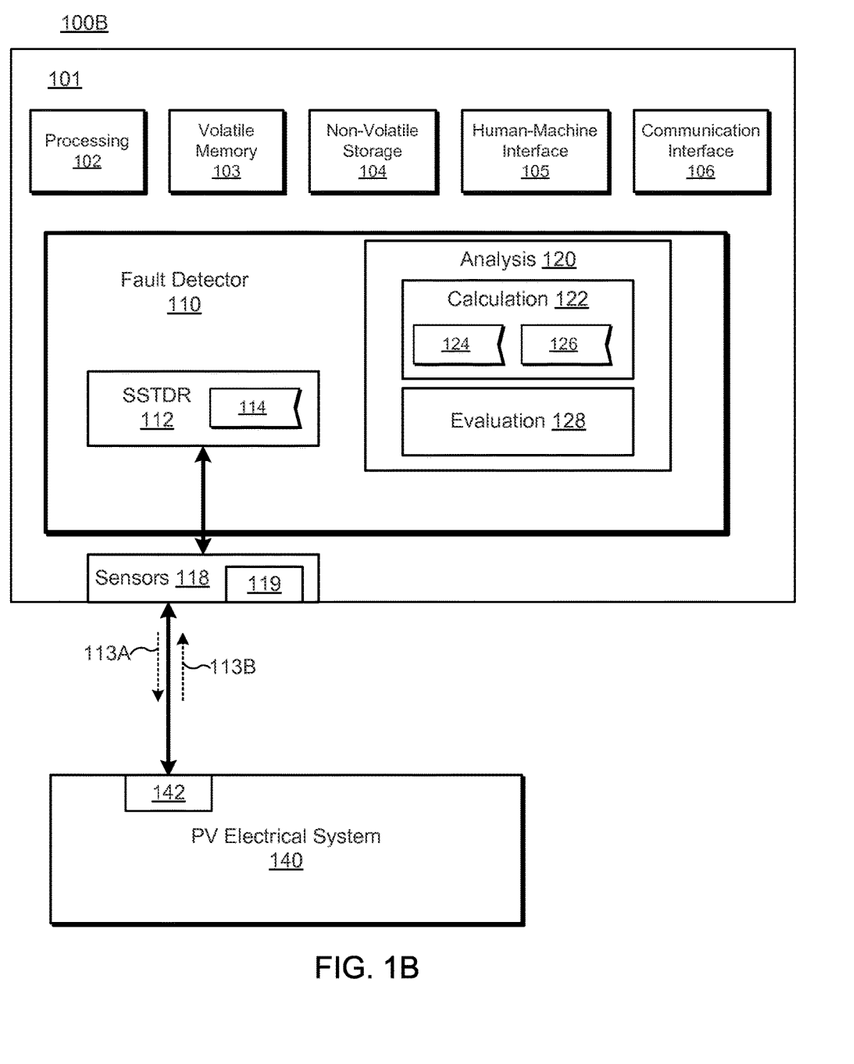
FIG. 1B is a schematic block diagram of another embodiment of a system for detecting fault conditions in a PV electrical system.

FIG. 1B is a block diagram of another embodiment of a system 100B for detecting a fault in a PV electrical system 140. The system 100B may comprise a fault detector 110 configured to detect fault conditions in a PV electrical system 140. In the FIG. 1B embodiment, the fault detector 110 is implemented by use of a computing device 101 that includes processing resources 102, volatile memory resources 103 (e.g., random access memory (RAM)), non-volatile storage resources 104, HMI 105 (e.g., display, input device(s), and the like), and a communication interface 106. The computing device 101 may include, but is not limited to: a personal computing device, a portable computing device, an embedded computing device, and/or the like.

The processing resources 102 may include, but are not limited to: general purpose central processing units (CPUs), ASICs, FPGAs, PLAs and/or the like. The non-volatile storage resources 104 may comprise non-transitory, machine-readable storage devices and/or media, such as a magnetic hard disk, a solid-state storage medium, an optical storage medium, and/or the like. The HMI 105 may comprise human-machine interface components, as disclosed herein. The communication interface 106 may communicatively couple the fault detector 110 to a network, as disclosed herein.

The SSTDR module 112 may be coupled to the PV electrical system 140 by use of, inter alia, sensors 118. The sensors 118 may be configured to generate input signals 113A and/or detect corresponding return output signals 113B. The sensors 118 may include a transceiver 117, input generator circuit 115A and/or signal detection circuit 115B, as disclosed herein. The sensors 118 may further comprise a measurement circuit 119 configured to measure and/or quantify the input signals 113A and/or output signals 113B. The measurement circuit 119 may comprise one or more voltage measurement devices, current measurement devices, phase measurement devices, and/or the like. The measurement circuit may further comprise an analog-to-digital conversion circuit to quantify the input and/or output signals 113A and 113B.

The fault detector 110 may be configured to acquire SSTDR autocorrelation data 114 by, inter alia, transmitting input signals 113A into the PV electrical system 140 (at a connection point 142), and detecting corresponding, reflected output signals 113B by use of the sensors 118, as disclosed herein. The SSTDR module 112 may be further configured to generate SSTDR autocorrelation data 114 by calculating an autocorrelation between the input signals 113A and the reflected output signals 113B.

The analysis module 120 may comprise a calculation module 122 configured to calculate difference data 126 based on, inter alia, the SSTDR autocorrelation data 114 acquired by the SSTDR module 112. As disclosed herein, the difference data 126 may comprise an autocorrelation difference between the SSTDR autocorrelation data 114 and the previously acquired baseline SSTDR autocorrelation data 124 (e.g., difference data 126=SSTDR autocorrelation data 114−baseline SSTDR autocorrelation data 124 and/or difference data 126=|SSTDR autocorrelation data 114−baseline SSTDR autocorrelation data 124|). The analysis module 120 may further comprise an evaluation module 128 configured to determine a) whether a fault exists in the PV electrical system 140, and/or b) a location of the fault by use of the difference data 126. In some embodiments, the evaluation module 128 is configured to distinguish faults from thermal and other inherent noise by a) calculating a cumulative energy of the difference data 126 (e.g., integrating the difference data 126), and b) comparing the cumulative energy to a threshold. The evaluation module 128 may trigger detection of a fault in response to, inter alia, the cumulative energy value corresponding to the difference data 126 exceeding the threshold. The evaluation module 128 may be further configured to determine the location of the fault (if any) within the PV electrical system 140 based on, inter alia, the magnitude of the signal(s) reflected from the fault (e.g., magnitude of the output signals 113B), as disclosed herein. The fault detector 110 may notify users of detected fault conditions by use of the HMI 105 and/or communication interface 106, as disclosed herein. Although not depicted in FIG. 1B, the fault detector 110 may comprise a mitigation module 130 configured to implement one or more fault mitigation operations in response to detection of a fault condition in the PV electrical system 140. As disclosed herein, the mitigation module 130 may be communicatively coupled to the PV electrical system 140, and may be configured to reconfigure the PV electrical system 140 in response to faults. Alternatively, or in addition, the mitigation module 130 may be configured to report fault conditions to a controller 144 of the PV electrical system 140, which may implement corresponding mitigation operations for the PV electrical system 140.

Figure 2:
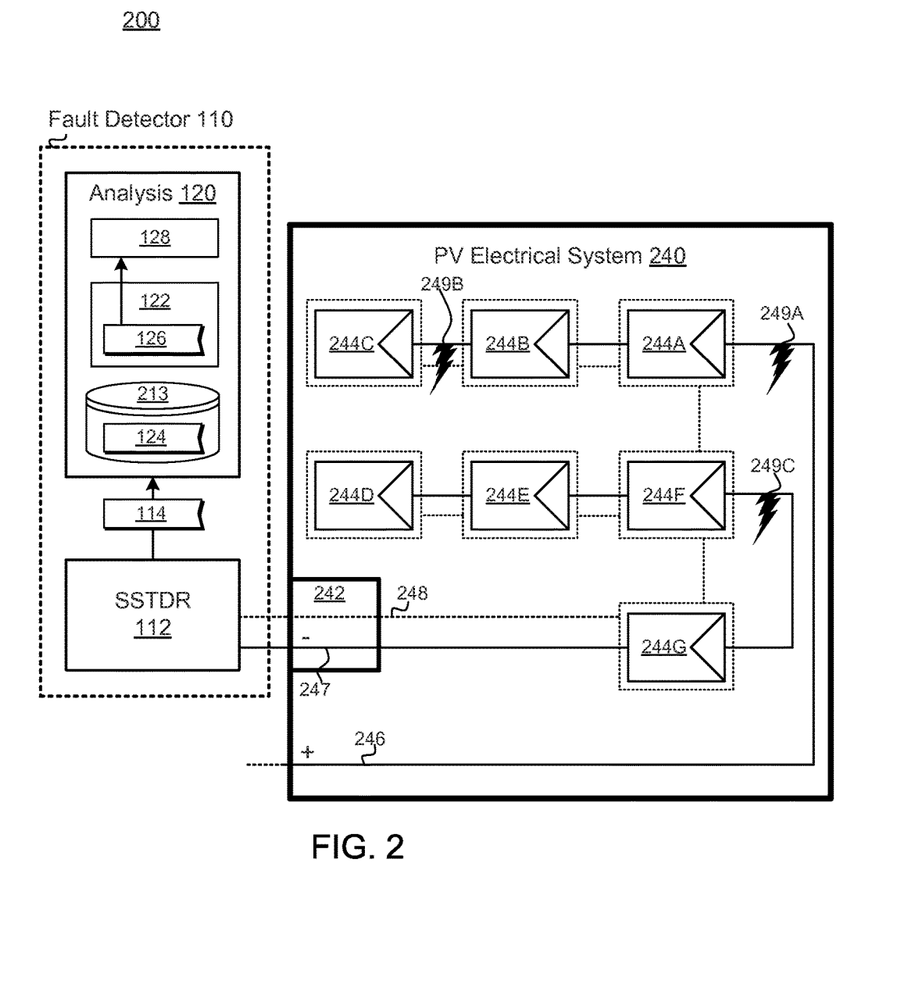
FIG. 2 is a schematic block diagram depicting another embodiment of a system that includes a fault detection module configured to detect fault conditions in a PV electrical system.

FIG. 2 is a schematic block diagram depicting another embodiment of a system 200 comprising a fault detector 110. The PV electrical system 240 of the FIG. 2 embodiment comprises a PV string that includes seven PV modules 244A-G connected in series between a positive terminal 246 and a negative terminal 247. The modules 244A-G have a maximum power ($P_{MAX}$) of 200 W, short circuit current ($I_{SC}$) of 3.83 A, open circuit voltage ($V_{OC}$) of 68.7 V, maximum power current ($I_{PMAX}$) of 3.59 A, and a maximum power voltage ($V_{PMAX}$) of 55.8 V. Although FIG. 2 depicts a particular embodiment of an PV electrical system 240, having PV modules 244A-G with particular characteristics, the disclosure is not limited in this regard, and could be adapted for use with any PV electrical system 240 comprising any type of PV modules.

In the FIG. 2 embodiment, the SSTDR module 112 is coupled to the negative terminal 247 of the PV electrical system 240 (at connection point 242). The fault detector 110 may also be connected to an equipment grounding conductor (EGO) 248 of the PV electrical system 240. The SSTDR module 112 may be electrically coupled to the PV electrical system 240 by use of one or more of: a transceiver 117, input generator circuit 115A, signal detection circuit 115B, sensors 118, analog-to-digital converter 119, and/or the like, as disclosed herein.

Figure 3A:
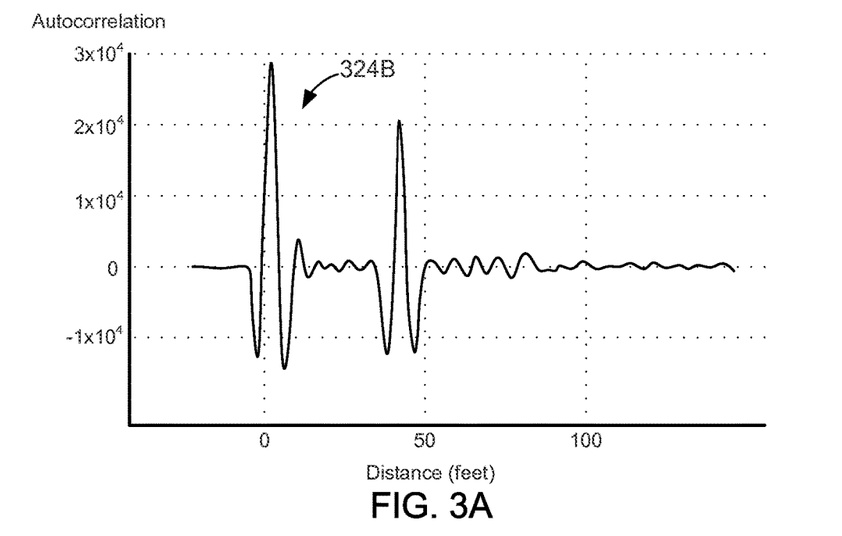
FIG. 3A depicts one embodiment of SSTDR autocorrelation data.

The SSTDR module 112 may be configured to acquire baseline SSTDR autocorrelation data 124 pertaining to the PV electrical system 240. As disclosed herein, the baseline SSTDR autocorrelation data 124 may be acquired during baseline operating conditions of the PV electrical system 240 (e.g., at a time that the PV electrical system 240 does not have a fault condition). The baseline SSTDR autocorrelation data 124 may be stored on a non-volatile storage device 213, a network storage location, and/or the like, as disclosed above. FIG. 3A depicts one embodiment of baseline SSTDR autocorrelation data 124 acquired by use of the SSTDR module 112.

Referring to FIG. 2, the fault detector 110 may be configured to monitor the PV electrical system 240 by periodically and/or continuously acquiring SSTDR autocorrelation data 114 from the PV electrical system 240, comparing the acquired SSTDR autocorrelation data 114 to the previously acquired baseline SSTDR autocorrelation data 124 (to calculate the difference data 126), and determining whether a fault is in the PV electrical system 240 using the difference data 126 (by use of the evaluation module 128).

Figure 3B:
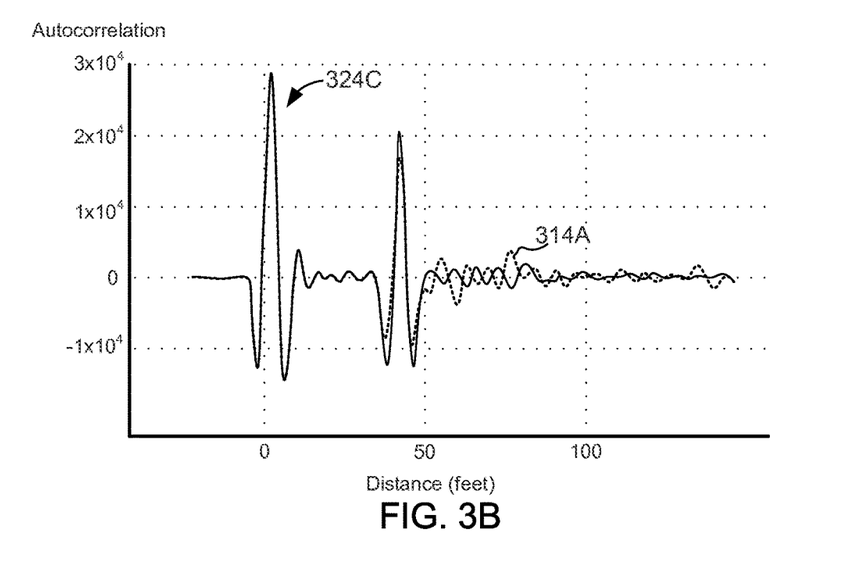
FIG. 3B depicts further embodiments of SSTDR autocorrelation data.

FIG. 3B depicts SSTDR autocorrelation data 314A acquired by the SSTDR module 112 in the presence of a ground fault 249A. In the FIG. 3B embodiment, the ground fault was created by connecting the interconnecting power cables of modules 244A-G to the EGO 248 through a 5 ohm fuse. As illustrated in FIG. 3B, the SSTDR autocorrelation data 314A differs from the baseline SSTDR autocorrelation data 124.

Figure 3C:
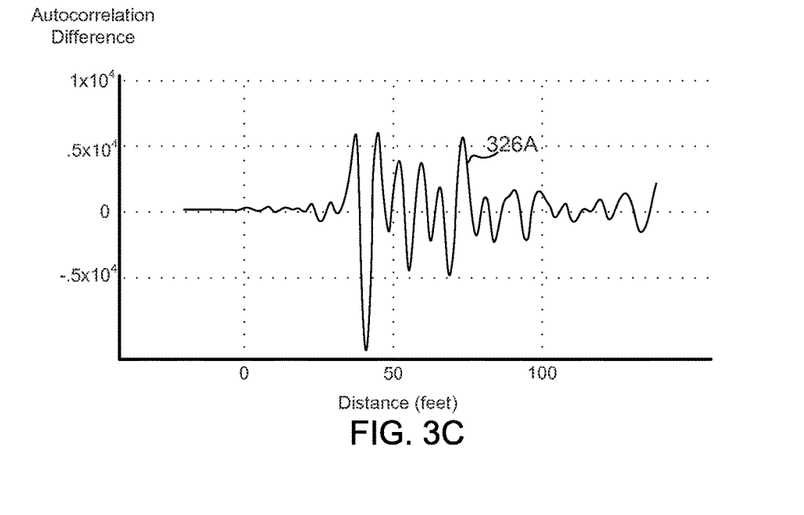
FIG. 3C depicts one embodiment of SSTDR autocorrelation difference data.
Figure 3D:
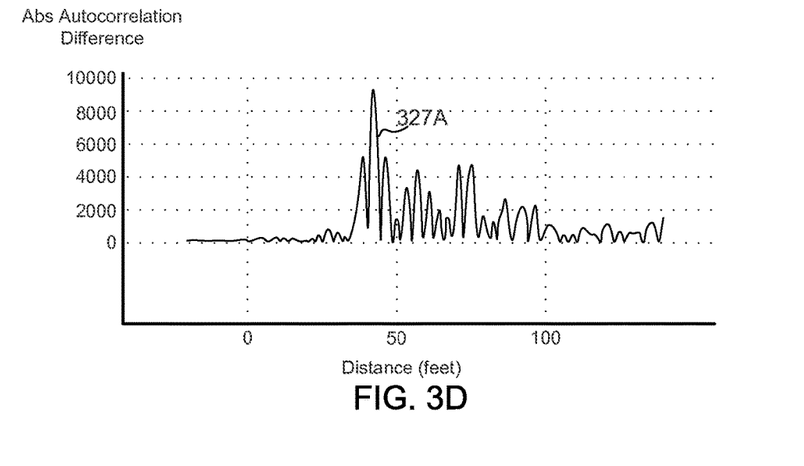
FIG. 3D depicts further embodiments of SSTDR autocorrelation difference data.

FIG. 3C illustrates difference data 326A. The difference data 326A of FIG. 3C is derived from the SSTDR autocorrelation data 314A acquired under the fault condition of 249A, and the baseline SSTDR autocorrelation data 124. FIG. 3D illustrates corresponding absolute value difference data 327A.

Figure 3E:
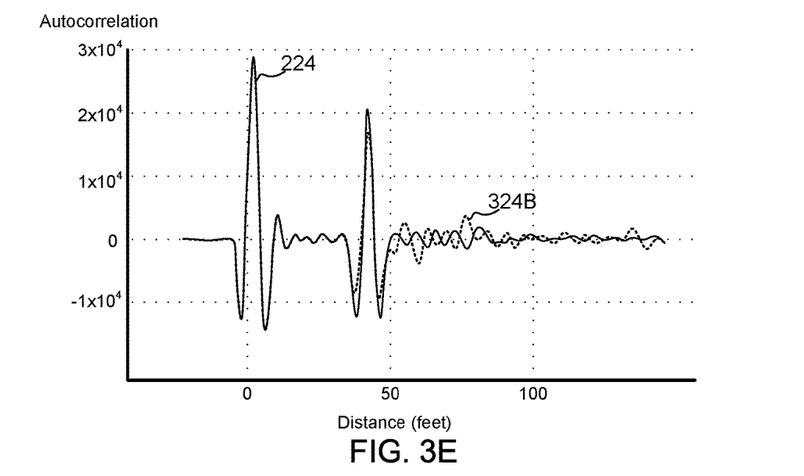
FIG. 3E depicts further embodiments of SSTDR autocorrelation data.
Figure 3F:
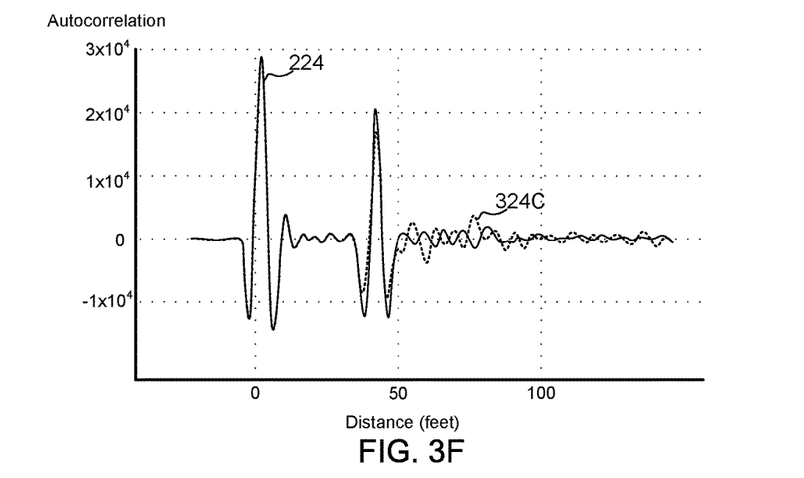
FIG. 3F depicts further embodiments of SSTDR autocorrelation data.
Figure 3G:
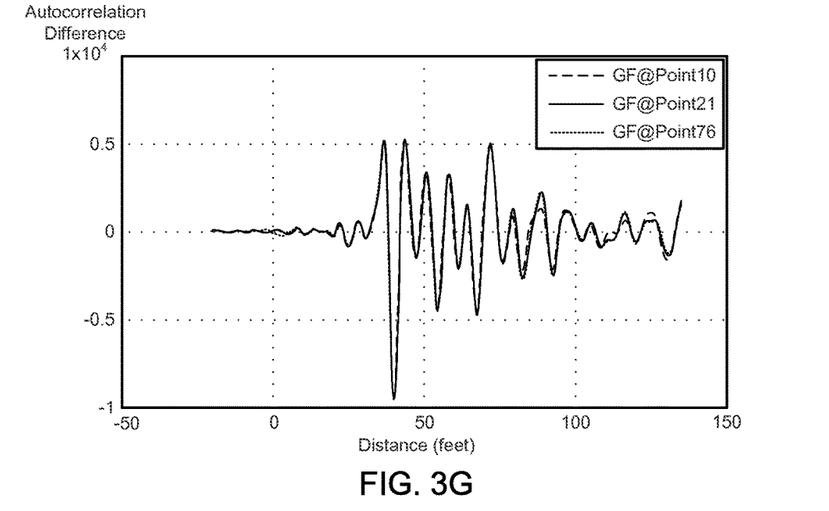
FIG. 3G depicts further embodiments of SSTDR autocorrelation difference data.
Figure 3H:
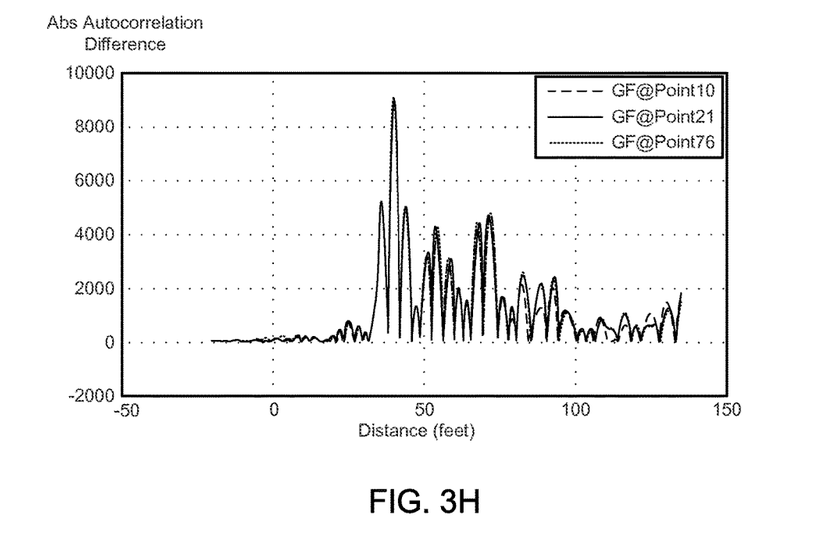
FIG. 3H depicts further embodiments of SSTDR autocorrelation difference data.

FIGS. 3E and 3F depict embodiments of SSTDR autocorrelation data 324B and 324C resulting from fault conditions at locations 249B and 249C, respectively. FIGS. 3G and 3H depict combined autocorrelation different data and absolute value autocorrelation difference data corresponding to the fault locations 249A (GF @ point 10), 249B (GF @ point 21), and 249C (GF @ point 76).

Figure 3I:
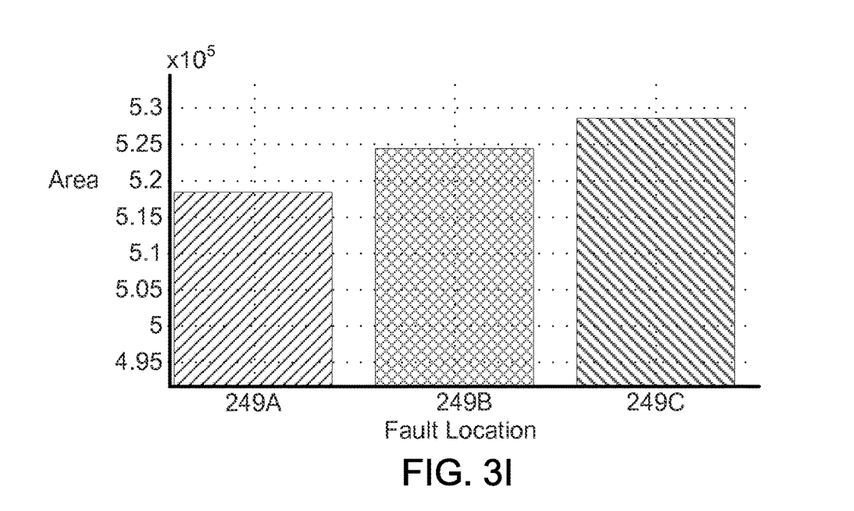
FIG. 3I depicts further embodiments of cumulative differences in SSTDR autocorrelation data.

As disclosed above, the cumulative difference between the SSTDR autocorrelation data 124A-C of the respective faults 249A-C may correspond to a location of the fault within the PV electrical system 240. Faults that are closer to the SSTDR module 112 may result in higher amplitude SSTDR reflection(s), resulting in larger cumulative differences between the SSTDR autocorrelation data 124A-C and the baseline SSTDR autocorrelation data 124. FIG. 3I depicts one embodiment of a plot comprising the cumulative difference between the SSTDR autocorrelation data 124A-C and the baseline SSTDR autocorrelation data 124 (e.g., cumulative area under a difference curve). As illustrated in FIG. 3I, the fault location 249 furthest from the SSTDR module 112 (fault location 249A) results in the smallest cumulative difference, and the fault closest to the SSTDR module 112 (fault location 249C) results in the largest cumulative difference.

Referring to FIG. 2, the evaluation module 128 may be configured to determine whether a fault exists in the PV electrical system 240 by comparing a) SSTDR autocorrelation data acquired from the PV electrical system 240 (by use of the SSTDR module 112) to b) previously recorded baseline SSTDR autocorrelation data 124. Determining whether a fault exists may comprise generating difference data 126 comprising one or more of a) a difference between the acquired SSTDR autocorrelation data 114 and the baseline SSTDR autocorrelation data 124, b) an absolute value difference, and/or c) a cumulative difference between the acquired SSTDR autocorrelation data 114 and the baseline SSTDR autocorrelation data 124. In some embodiments, a fault is detected in response to determining that the cumulative difference exceeds a threshold.

In response to detecting a fault, the evaluation module 128 may be further configured to determine the location of the fault based on, inter alia, the cumulative difference between the acquired SSTDR autocorrelation data 114 and the baseline SSTDR autocorrelation data 124. The cumulative difference may be proportional to the distance between the fault and the SSTDR module 112 (e.g., the distance between the fault and the connection point 242 of the SSTDR module 112 to the PV electrical system 240). As disclosed above, the cumulative difference may have a non-linear relationship to fault distance (e.g., exponential, polynomial, or the like).

Figure 4:
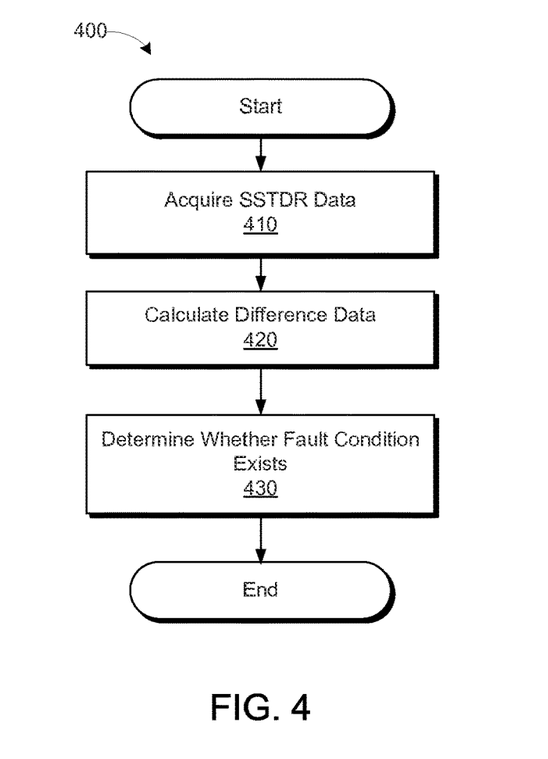
FIG. 4 is a flow diagram of one embodiment of a method for fault detection.

FIG. 4 is a flow diagram of one embodiment of a method 400 for fault detection using SSTDR. The method 400, and the other methods disclosed herein, may be implemented by use of program instructions stored on a non-transitory, computer-readable storage medium, such as the non-volatile storage resources 104 of the computing system 101. Alternatively, or in addition, steps of the method 400 may be implemented by use of particular machine components, such as a circuit, ASIC, FPGA, PLA, input generator circuit 115A, signal detection circuit 115B, transceiver 117, sensors 118, analog-to-digital converter 119, and/or the like.

Step 410 may comprise acquiring SSTDR autocorrelation data from a PV electrical system. Step 410 may include a) transmitting a signal 113A into the PV electrical system, and b) detecting a corresponding reflected signal 113B from the PV electrical system by use of, inter alia, an SSTDR module 112, as disclosed above. Step 410 may, therefore, comprise generating an input signal 113A by use of an input generator circuit 115A. Step 410 may further comprise measuring and/or quantifying the input signal 113A by use of one or more measurement devices, analog-to-digital converters, and/or the like. Step 410 may further include measuring one or more return output signals 113B by use of one or more measurement devices, analog-to-digital converters, and/or the like.

Step 420 may comprise comparing the SSTDR autocorrelation data acquired at step 410 to previously acquired baseline SSTDR autocorrelation data. As disclosed above, the baseline SSTDR autocorrelation data may comprise SSTDR autocorrelation data acquired when no fault(s) exist in the PV electrical system. In some embodiments, the baseline SSTDR autocorrelation data comprises an average of a plurality of separate SSTDR autocorrelation data sets that account for different operating conditions of the PV electrical system (e.g., presence of sunlight, absence of sunlight, shade conditions, noise levels, and so on).

Step 420 may comprise accessing the baseline SSTDR autocorrelation data from a persistent storage device, such as a hard disk, solid-state storage, network storage location, or the like. Alternatively, or in addition, step 420 may comprise accessing the baseline SSTDR autocorrelation data in a volatile memory (RAM), by network transmission, and/or the like.

Step 420 may comprise comparing the SSTDR autocorrelation data acquired at step 410 to the baseline SSTDR autocorrelation data by, inter alia, generating difference data, such as a difference between the acquired SSTDR autocorrelation data and the baseline autocorrelation data, an absolute value difference between the SSTDR autocorrelation data and the baseline autocorrelation data, and/or a cumulative difference between the SSTDR autocorrelation data and the baseline SSTDR autocorrelation data.

Step 430 may comprise determining whether a fault condition exists based on the comparison(s) of step 420. Step 430 may comprise determining whether the cumulative difference between the acquired SSTDR autocorrelation data and the baseline SSTDR autocorrelation data exceeds a threshold. Step 430 may further comprise determining a location of the fault within the PV electrical system based on the cumulative difference (e.g., by use of a ratio between cumulative difference and distance between the connection point to the SSTDR module and the fault).

In some embodiments, step 430 further comprises implementing one or more fault mitigation operations in response to determining that a fault condition exists. The fault mitigation operations may include, but are not limited to: displaying information pertaining to the fault on a HMI component of a fault detection device 108 and/or computing device 101, transmitting an alert and/or notification pertaining to the fault, reconfiguring the PV electrical system, communicating an alert and/or notification pertaining to the fault to a controller of the PV electrical system, and/or the like.

Figure 5:
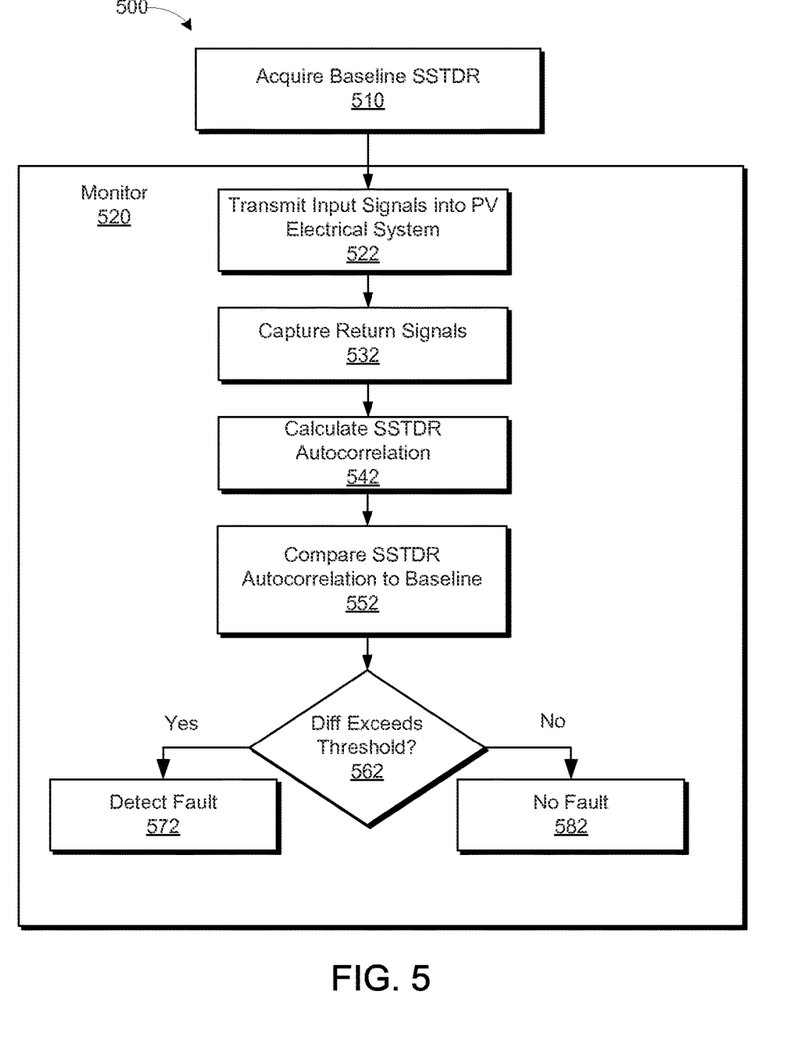
FIG. 5 is a flow diagram of another embodiment of a method for fault detection.

FIG. 5 is a flow diagram of another embodiment of a method 500 for detecting faults in a PV electrical system. Step 510 may comprise acquiring baseline SSTDR data pertaining to a PV electrical system. Step 510 may comprise generating input signals 113A for transmission into the PV electrical system, transmitting the input signals 113A into the PV electrical system, detecting corresponding output signals 113B, and calculating SSTDR data by use of the input signals 113A and detected output signals 113B. Step 510 may comprise acquiring SSTDR data during non-fault operating conditions of the PV electrical system (e.g., when no fault condition(s) exist in the PV electrical system), such as during initial configuration and/or deployment of the PV electrical system and/or during controlled operating conditions of the PV electrical system. Step 510 may comprise combining a plurality of different SSTDR autocorrelation data sets acquired at different times and/or under different, non-fault operating conditions of the PV electrical system, as disclosed herein.

Step 520 may comprise monitoring the PV electrical system to detect a fault condition. Step 520 may be implemented by use of a dedicated fault detector 110 embodied as a module of a dedicated fault detection device 108, a module of a computing device 101, and/or the like. The monitoring of step 520 may comprise periodically monitoring the PV electrical system (e.g., at a particular monitoring interval or period), continuously monitoring the PV electrical system (e.g., continuously transmitting input signals 113A into the PV electrical system and capturing return output signals 113B), and/or the like.

Monitoring the PV electrical system at step 520 may comprise transmitting input signals into the PV electrical system at step 522. Step 522 may include generating an input signal 113A (by use of an input generator circuit 115A, a transceiver 117, sensors 118, and/or the like), transmitting the input signal 113A into the PV electrical system (through an electrical connection), and/or quantifying the input signal 113A. Monitoring the electrical power system at step 520 may further comprise capturing return signals corresponding to the input signal of step 522 at step 532. Step 532 may comprise determining a return signal 1138 by acquiring measurements from the PV electrical system, such as voltage measurements, current measurements, phase measurements, and/or the like. Step 532 may further comprise quantizing the measurements by use of, inter alia, an analog-to-digital converter and/or the like. Step 542 may comprise calculating SSTDR autocorrelation data by use of the input signal 113A and acquired output signal 1138, as disclosed herein. Step 542 may comprise calculating an SSTDR autocorrelation by use of the SSTDR module 112, which may comprise a hardware component, such as a circuit, ASIC, processor, FPGA, PLA, and/or the like. Alternatively, step 542 may comprise calculating the SSTDR autocorrelation by use of general-purpose computing resources in accordance with machine-readable instructions stored on a non-transitory computer-readable storage medium.

Step 552 of the monitoring step 520 comprises comparing the SSTDR autocorrelation data calculated at step 542 to the baseline SSTDR autocorrelation data acquired at step 510. Step 552 may comprise accessing and/or loading baseline SSTDR autocorrelation data from a non-transitory computer-readable storage medium, network storage location, and/or the like. Step 552 may comprise determining a difference between the SSTDR autocorrelation data calculated at step 542 and the baseline SSTDR autocorrelation data of step 510. Step 552 may comprise determining a cumulative difference (Diff) by, inter alia, accumulating sample-by-sample comparisons of the SSTDR autocorrelation data. In some embodiments, step 552 comprises calculating an SSTDR autocorrelation difference function (SSTDR Diff) as one or more of: SSTDR Diff=SSTDR autocorrelation data 114−baseline SSTDR autocorrelation data 124, or SSTDR Diff=|SSTDR autocorrelation data 114−baseline SSTDR autocorrelation data 124|, as disclosed herein. Step 552 may further comprise determining a cumulative SSTDR difference by use of the SSTDR Diff function (e.g., calculating an integral of the SSTDR Diff function). Alternatively, or in addition, step 552 may comprise determining a cumulative difference (Diff) in discrete measurements sets comprising N values by:

$$\text{Diff}=\Sigma_{k=0}^{N}|\text{SSTDR\_Current}[k]-\text{SSTDR\_Baseline}[k]|$$

In step 552, SSTDR_Current[k] may correspond to the "kth" of N discrete values of the SSTDR autocorrelation data acquired at steps 522, 532, and 542, and SSTDR_Basline[k] may correspond to the "kth" discrete value of the SSTDR baseline data acquired at step 510. Alternatively, step 552 may comprise calculating a cumulative difference value (Diff) of continuous SSTDR autocorrelation data as a function of time (t from 0 to T):

$$\text{Diff}=\int_{t=0}^{T}|\text{SSTDR\_Current}(t)-\text{SSTDR\_Baseline}(t)|$$

Step 562 may comprise determining whether a fault exists based on the comparison of step 552. Step 562 may comprise comparing a cumulative difference (Diff) between the SSTDR autocorrelation data and the baseline SSTDR autocorrelation data. Step 562 may comprise a threshold comparison, such that a fault is detected if the cumulative difference (Diff) exceeds a pre-determined threshold. The value of the threshold may be determined by testing and experience. Step 562 may comprise accessing and/or referencing the pre-determined threshold on a non-transitory storage medium. If the cumulative difference of step 552 exceeds the pre-determined threshold, the flow continues at step 572; otherwise, the flow continues at step 582.

Step 572 comprises detecting a fault condition in the PV electrical system. Step 572 may comprise one or more of a) generating a fault notification, b) recording information pertaining to the detected fault on a storage medium, c) transmitting information pertaining to the detected fault on a communication network, and/or the like. Step 572 may include notifying one or more users of the fault condition by use of HMI components 105 of the fault detection device 108 and/or computing device 101, which may include, but is not limited to: displaying an alert on a display device, issuing a notification through an audio output, triggering an alarm system, transmitting one or more notification messages (by use of the communication interface 106), and/or the like. Step 572 may further comprise providing information pertaining to the detected fault, such as cumulative location of the fault, which may be based on the comparison of step 552, the cumulative difference (Diff), the topology of the PV electrical system, and/or the like. Step 572 may further comprise implementing one or more prophylactic operations, such as disconnecting portions of the PV electrical system, isolating one or more portions of the PV electrical system, and/or the like. In some embodiments, 572 further comprises storing a record of the detected fault condition on a non-transitory storage medium, network storage resource, and/or the like.

Step 582 comprises determining that a no-fault condition exists in the monitored portion of the PV electrical system. Step 582 may comprise notifying a user of the no-fault condition (by use of HMI components 105 and/or communication interface 106). Step 582 may further include recording the no-fault condition on a non-transitory storage medium, network storage resource, and/or the like.

The monitoring step 520 may further include scheduling another monitoring operation following completion of steps 572 and/or 582. Scheduling the monitoring operation may comprise delaying monitoring operations until a later time (e.g., in accordance with a pre-determined monitoring period or frequency), starting a new monitoring operation, monitoring a different portion of the PV electrical system, and/or the like.

Reference throughout this specification to "some embodiments" or an "embodiment" means that a particular feature, structure, or characteristic described in connection with the embodiment is included in at least one embodiment. Thus, the appearance of the phrases "in one embodiment" or "in some embodiments" in various places throughout this specification are not necessarily all referring to the same embodiment. Furthermore, an "embodiment" may be a system, a device, an article of manufacture, a method, and/or a process.

The phrases "connected to," "networked," "in communication with," and "communicatively coupled to" refer to any form of interaction between two or more entities, including mechanical, electrical, magnetic, and electromagnetic interactions. Two components may be connected to each other even though they are not in direct physical contact with each other and even though there may be intermediary devices between the two components.

Some of the infrastructure that can be used with embodiments disclosed herein is already available, such as: general-purpose processors, programming tools and techniques, machine-readable storage media, and communications networks and interfaces. A computing device may include a processor, such as a microprocessor, microcontroller, logic circuitry, or the like. The processor may include a special purpose processing device, such as an application-specific integrated circuit (ASIC), a programmable array logic (PAL), a programmable logic array (PLA), a programmable logic device (PLD), a field-programmable gate array (FPGA), and/or other processing means. The computing device may also include a computer-readable storage medium, such as non-volatile memory, static RAM, dynamic RAM, ROM, CD-ROM, disk, tape, magnetic, optical, flash memory, or other non-transitory machine-readable storage medium.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the scope of the disclosure.

What is claimed is:

1. A method for fault detection in an electrical system comprising one or more photovoltaic elements by use of spread spectrum time domain reflectometry (SSTDR) autocorrelation difference data, the method comprising:
   performing fault detection by use of SSTDR autocorrelation data acquired from the electrical system at different respective acquisition times, wherein performing the fault detection comprises:
   using a sensor electrically coupled to the electrical system to acquire SSTDR autocorrelation data pertaining to the electrical system at a first acquisition time;
   calculating SSTDR autocorrelation difference data corresponding to a difference between the acquired SSTDR autocorrelation data and baseline SSTDR autocorrelation data pertaining to the electrical system, the baseline SSTDR autocorrelation data acquired at an acquisition time different from the first acquisition time;
   comparing the calculated SSTDR autocorrelation difference data to a threshold; and
   determining whether a fault exists in the electrical system based on the comparing.

2. The method of claim 1, wherein the SSTDR autocorrelation difference data comprises a cumulative difference between the acquired SSTDR autocorrelation data and the baseline SSTDR autocorrelation data.

3. The method of claim 2, further comprising determining that the fault exists in the electrical system in response to the cumulative difference exceeding the threshold.

4. The method of claim 3, further comprising estimating a distance to a fault location by use of the cumulative difference.

5. The method of claim 1, wherein the baseline SSTDR autocorrelation data comprises an average of a plurality of different sets of SSTDR autocorrelation data acquired from the electrical system at each of a plurality of acquisition times, each of the plurality of acquisition times different from the first acquisition time.

6. The method of claim 1, further comprising implementing a mitigation operation in response to determining that the fault exists in the electrical system.

7. The method of claim 6, wherein the mitigation operation comprises one or more of: transmitting a notification pertaining to the fault, displaying information pertaining to the fault on a display device, and reconfiguring the electrical system.

8. An apparatus for implementing fault detection based on differences in spread spectrum time domain reflectometry (SSTDR) autocorrelation data obtained from an electrical system comprising one or more photovoltaic strings, the apparatus comprising:
   a fault detection device comprising a processor and memory, the fault detection device configured to:
   obtain first SSTDR autocorrelation data pertaining to the electrical system by use of a sensor device electrically coupled to the electrical system, the first SSTDR autocorrelation data acquired at a first acquisition time;
   generate SSTDR autocorrelation difference data corresponding to a difference between the first SSTDR autocorrelation data and baseline SSTDR autocorrelation data by use of the processor, the baseline SSTDR autocorrelation data acquired at an acquisition time different from the first acquisition time; and
   determine whether a fault condition exists in the electrical system based on a comparison between the generated SSTDR autocorrelation difference data and a threshold.

9. The apparatus of claim 8, wherein the sensor comprises a transceiver configured to transmit input signals into the electrical system and to detect corresponding output signals returned from the electrical system in response to the input signals.

10. The apparatus of claim 8, wherein the generated SSTDR autocorrelation difference data comprises a cumulative difference between the first SSTDR autocorrelation data and the baseline SSTDR autocorrelation data.

11. The apparatus of claim 8, wherein the generated SSTDR autocorrelation difference data corresponds to an area under a curve, the curve comprising an absolute value of a difference between the first SSTDR autocorrelation data and the baseline SSTDR autocorrelation data.

12. The apparatus of claim 8, wherein the fault detection device is configured to determine that the fault condition exists in the electrical system in response to the generated SSTDR autocorrelation difference data exceeding the threshold.

13. The apparatus of claim 12, wherein the fault detection device is further configured to estimate a distance between the sensor and a fault corresponding to the fault condition by use of the generated SSTDR autocorrelation difference data.

14. The apparatus of claim 8, wherein the baseline SSTDR autocorrelation data comprises an average of a plurality of different SSTDR autocorrelation data sets acquired at respective acquisition times different from the first acquisition time.

15. The apparatus of claim 8, wherein the fault detection device is further configured to implement one or more mitigation operations in response to determining that the fault condition exists in the electrical system.

16. A non-transitory storage medium comprising instructions for execution by a computing device, the instructions configured to cause the computing device to perform a method for fault detection based on differences in spread spectrum time domain reflectometry (SSTDR) autocorrelation data acquired from an electrical network comprising a photovoltaic string, the fault detection method comprising:
   performing fault detection by use of SSTDR autocorrelation data acquired from the electrical network at different respective times, comprising:
   acquiring first SSTDR autocorrelation data pertaining to the electrical network at a first acquisition time;

calculating a cumulative difference between the first SSTDR autocorrelation data and baseline SSTDR autocorrelation data pertaining to the electrical network, the baseline SSTDR autocorrelation data acquired at an acquisition time different from the first acquisition time;

comparing the cumulative difference between the first SSTDR autocorrelation data and the baseline SSTDR autocorrelation data to a fault detection threshold; and detecting a fault in the electrical network in response to the comparing indicating that the cumulative difference exceeds the fault detection threshold.

17. The non-transitory storage medium of claim 16, the method further comprising calculating an estimate of a location of the fault in the electrical network based on the cumulative difference.

18. The non-transitory storage medium of claim 17, wherein the estimate of the location of the fault is calculated based on a non-linear relationship between fault distance and the cumulative difference.

19. The non-transitory storage medium of claim 16, wherein acquiring the first SSTDR autocorrelation data comprises:

transmitting an input signal into the electrical network by use of a signal generator; and detecting an output signal from the electrical network in response to the input signal by use of a signal detector.

20. The non-transitory storage medium of claim 16, wherein the baseline SSTDR autocorrelation data corresponds to a plurality of SSTDR autocorrelation data sets acquired under different respective operating conditions of the electrical network at respective acquisition times different from the first acquisition time.

* * * * *